Patented Dec. 6, 1932

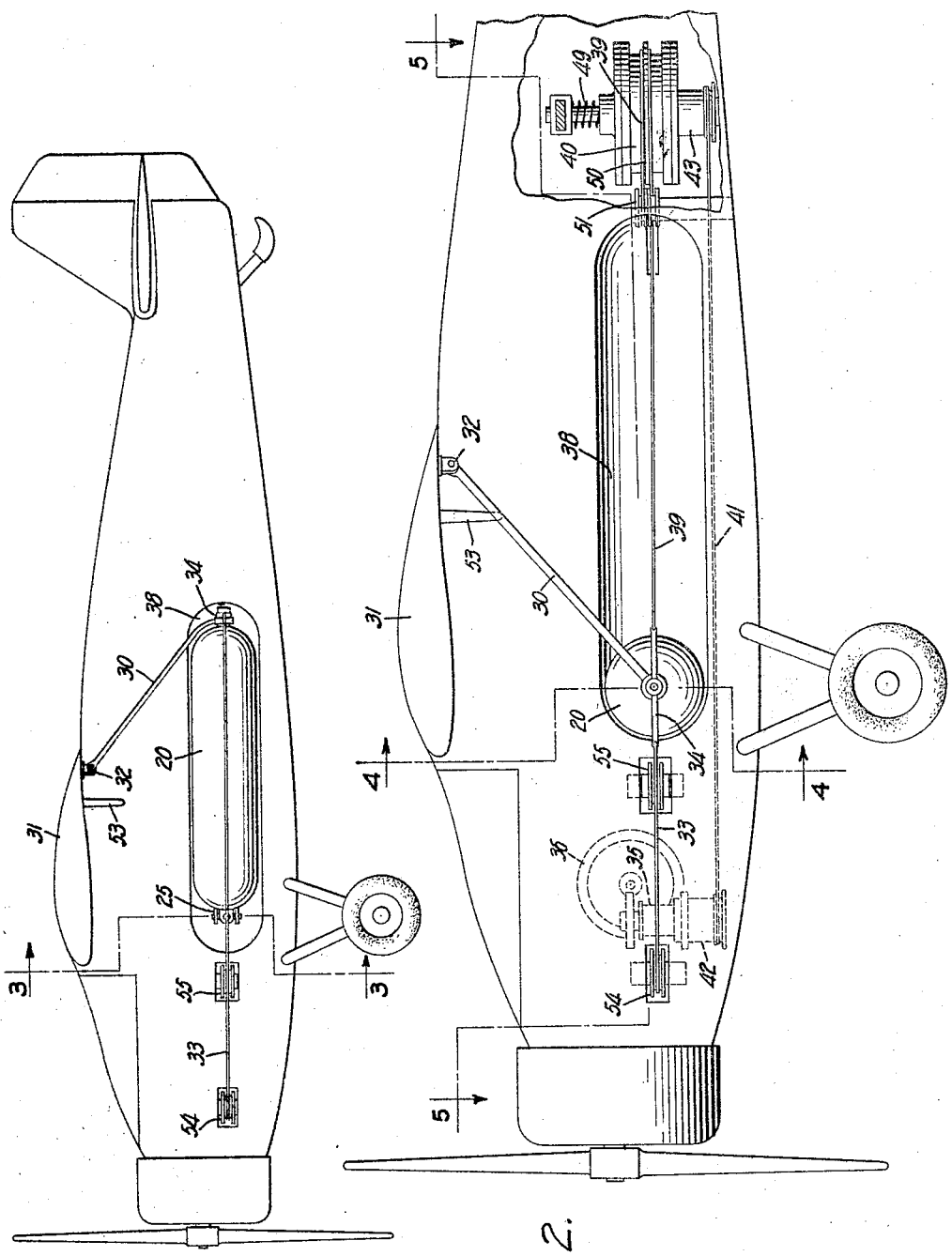

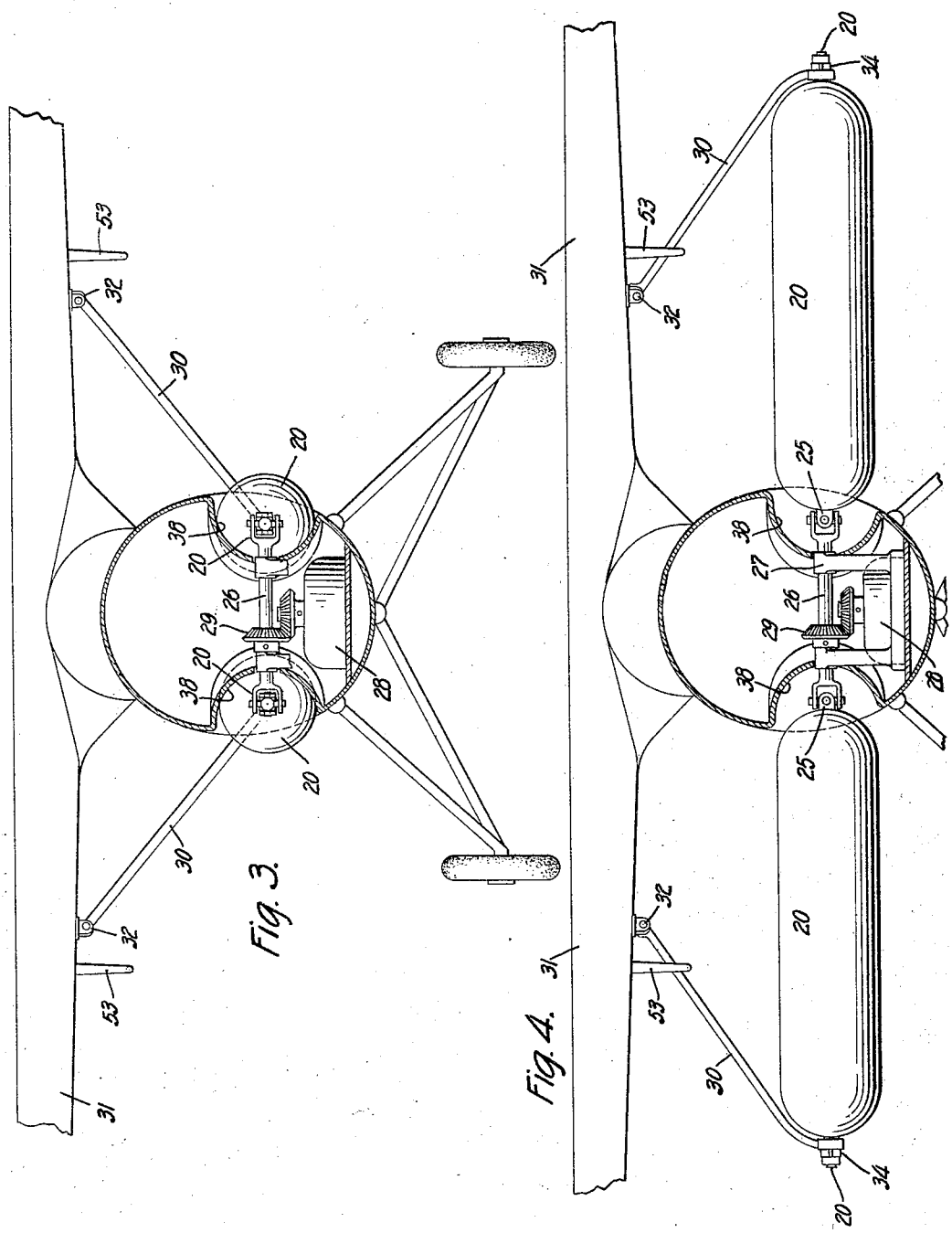

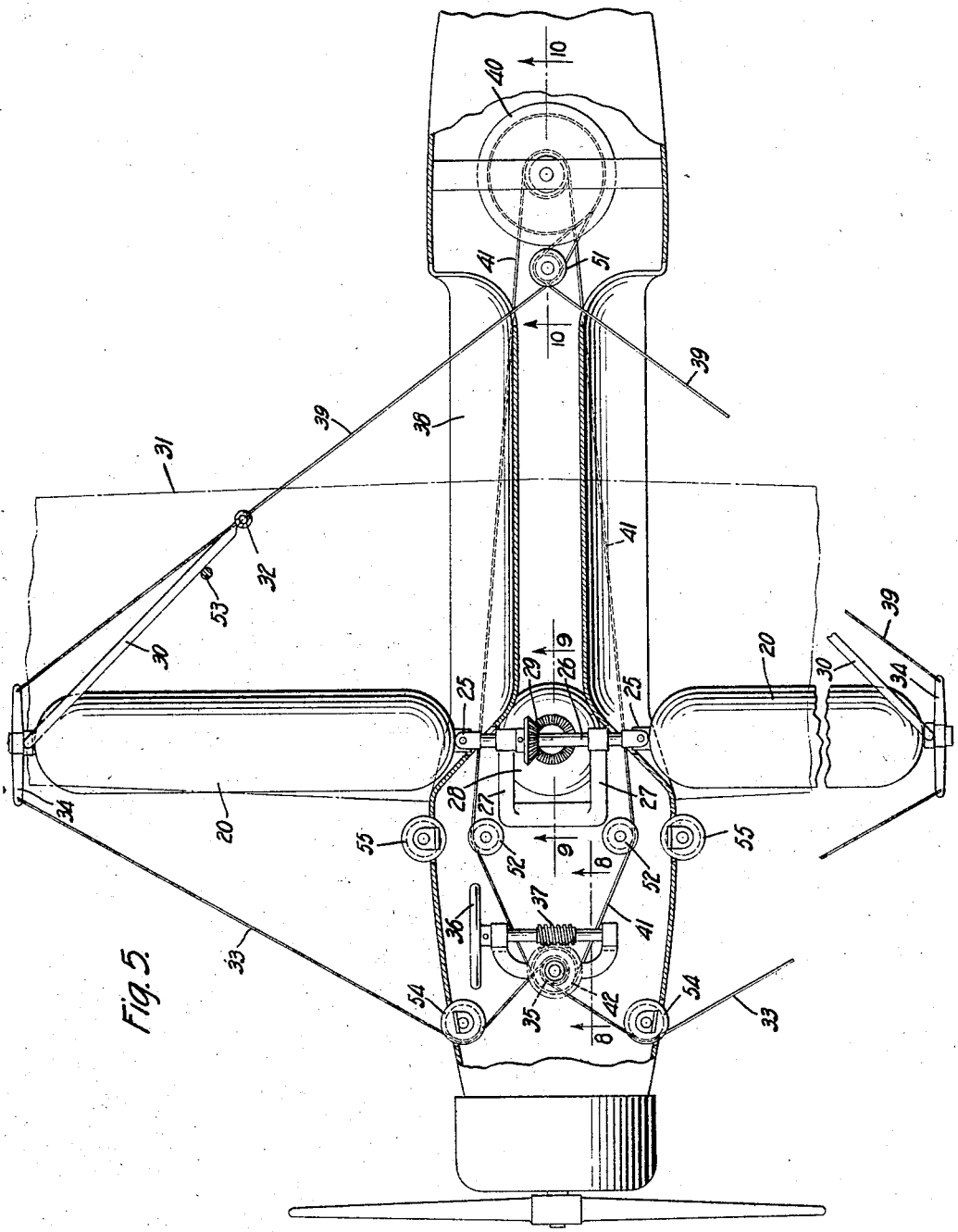

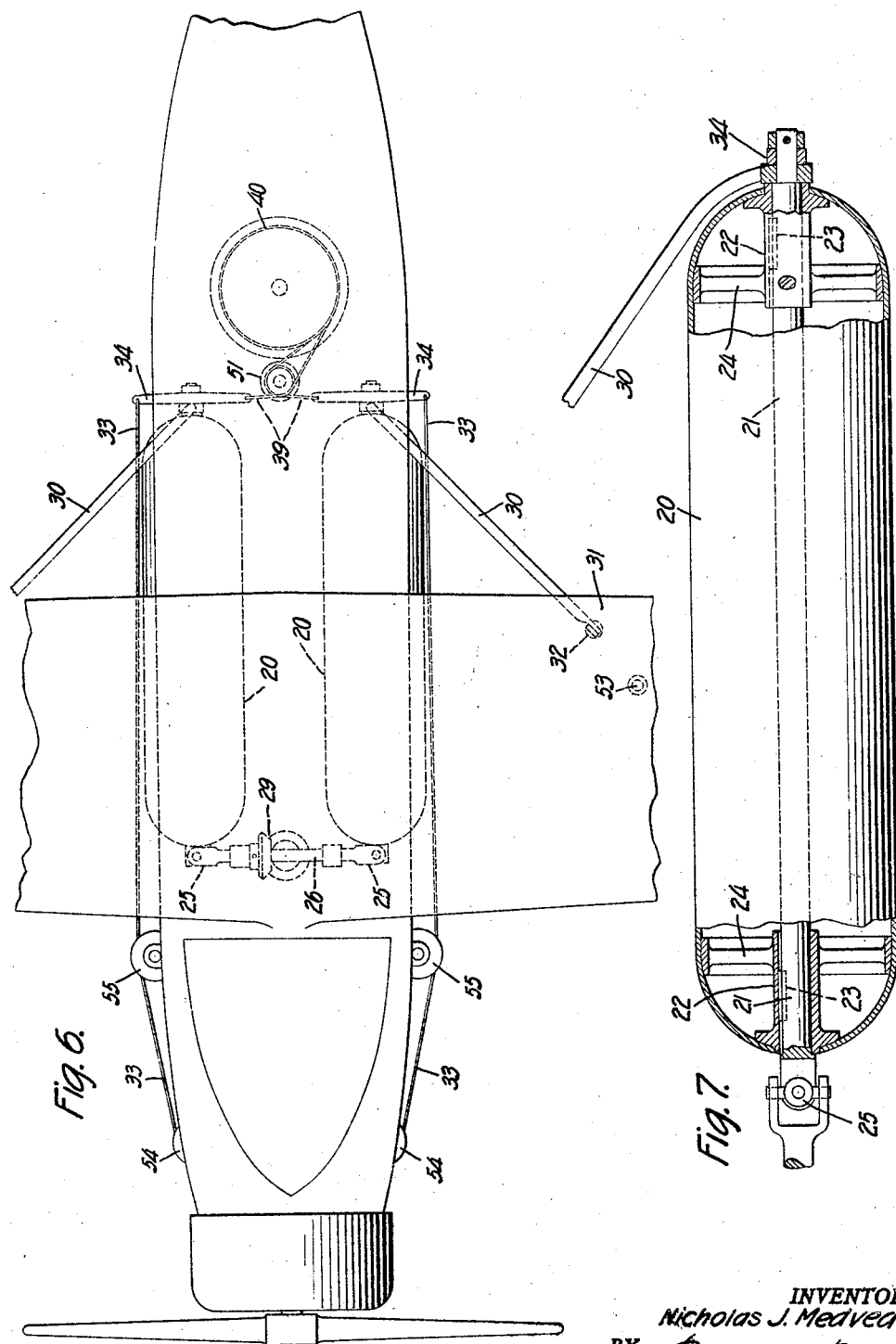

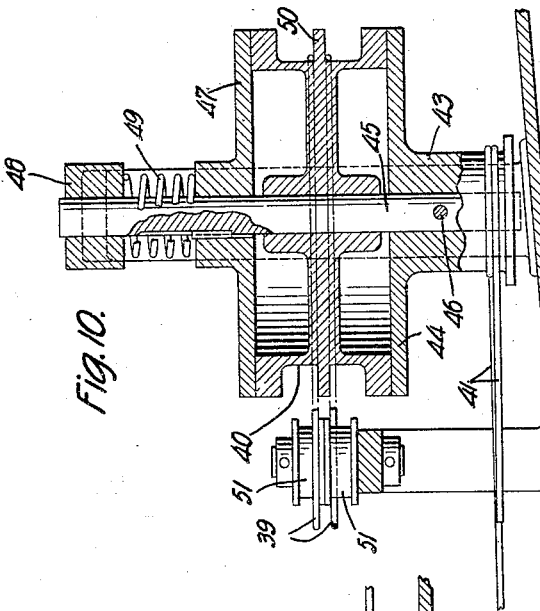
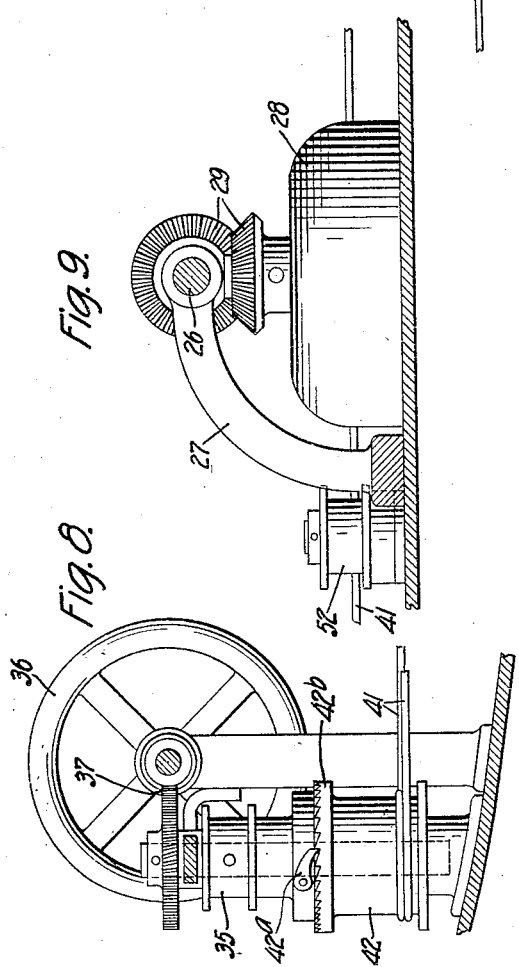
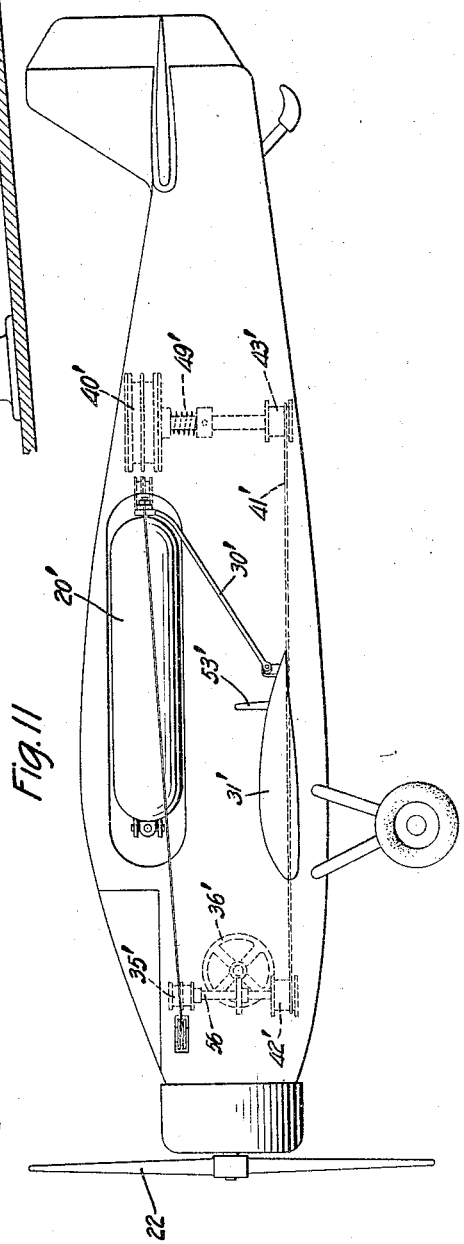

1,890,064

UNITED STATES PATENT OFFICE

NICHOLAS J. MEDVEDEFF, OF LARCHMONT, NEW YORK

AIRPLANE

Application filed July 24, 1930. Serial No. 470,409.

The present invention relates to aircraft in general and more particularly to heavier-than-air machines of the plane or wing type. The main object of the invention is to provide such machines with an arrangement of apparatus or devices which, independently of, or in cooperation with, the propelling means of the machine, facilitates the ascent or descent of the machine.

More particularly the object of the present invention is to provide an improved arrangement so that the aircraft may rise or ascend from the ground or from any level to any other desired level in a much shortened linear range. The same apparatus is, of course, employed for descending or landing with the same effect. Moreover, the devices being particularly useful during ascents and descents, it is frequently desirable to remove the effect of this apparatus during normal flight. For this reason, therefore, the present invention also comprehends apparatus of the type above described and provided with means whereby its effect during normal flight is minimized or entirely eliminated. For this purpose the present invention is in part directed to apparatus and devices for moving the lifting arrangement from its operative to its inoperative position and also for moving the same in the reverse direction, whether the plane be in flight or on the ground.

Further, more detailed and more specific features and advantages will appear from the detailed description of the present invention which appears hereinafter and from the accompanying drawings which constitute a part of the present invention.

In the drawings:

Figure 1 constitutes a side elevation of an airplane embodying the present invention and showing the rotors in inoperative position.

Figure 2 is a similar view of the airplane showing the rotors in operative position and also showing in part, the apparatus for moving the rotors from operative to inoperative position.

Figure 3 is a front sectional view of the airplane taken on the line 3—3 of Figure 1.

Figure 4 is a view similar to Figure 3 taken on the line 4—4 of Figure 2.

Figure 5 is a horizontal sectional view taken on the line 5—5 of Figure 2.

Figure 6 is a partial plan view of the airplane with the rotors in their inoperative positions.

Figure 7 is a detailed view showing the construction of the rotor and its mounting.

Figure 8 is a side elevation of a detail of the apparatus viewed as indicated by line 8—8 of Figure 5.

Figure 9 is a view of the operating mechanism of the rotors and viewed as indicated by line 9—9 of Figure 5.

Figure 10 is another detail of the apparatus viewed as indicated by line 10—10 of Figure 5.

Figure 11 is a side elevational view similar to Figure 1 of a modified form of the invention.

The present invention relates broadly to aircraft and to apparatus which is designed to utilize the Magnus effect to assist in the rising or landing of such aircraft or generally in ascents or descents of such aircraft so that such operations may be accomplished at very sharp angles which may perhaps approach the vertical.

More particularly the present invention relates to the employment of a pair of rotatable rotors which extend laterally from the fuselage of the airplane, the rotors being rotated along the horizontal axis at a speed under the control of the pilot. The rotation of such rotors cooperates with air currents blowing in a direction at right angles to the axis of the cylinders to bring about a reaction which is effective upon the rotors along a line upward and rearward at an angle about 80° to the direction of the air current. While under some conditions the air currents existing in the ambient atmosphere may be employed for that purpose, in the case of airplanes the air current created by the propeller is utilized to cooperate with the rotation of the cylinders to obtain the desired effect in the desired direction.

In the embodiment of the invention disclosed in the present application, the rotors in the form of cylinders are indicated by the reference characters 20. A pair of such cylinders are provided one on each side of the fuselage, as shown. The detailed construction of each of the cylinders or rotors is shown in Figure 7. It will be understood, however, that the specific structural form of the rotor may be varied in any manner desired.

In the specific form shown in Figure 7, the cylinder 20 is provided with a longitudinal shaft 21 which passes through the entire length of the rotor and is supported internally of the rotor by means of a journal 22 at each end of the cylinder or rotor, each journal being keyed to the shaft as shown at 23, and each journal also carrying a spider structure 24 for increasing the rigidity of the rotor 20 and for generally effecting a suitable rigid assembly.

The inner end of each shaft 21 is connected by means of a universal joint 25 to the shaft 26 which is carried by the fuselage and disposed transversely thereof, the shaft being supported by means of a pair of brackets 27, as shown in Figures 4 and 9. The shaft 26 is rotated by means of a combined motor and clutch 28 which transmits its power to the shaft 26 through the gears 29.

By the operation of the motor 28 the pilot may control the speed and the direction of rotation of the rotors 20 when the same are in their extended and operative positions. The free end of each rotor 20 and of each shaft 21 which projects therefrom at such free end, is supported by a suitably shaped supporting rod 30, the other end of the rod being fixed to the wing 31 of the aircraft by means of a universal pivotal mounting 32. As shown in Figures 1 to 10, the rotors 20 are disposed below the wings 31. It will be understood, however, that this relationship may be reversed, as shown for example in Figure 11 where the rotors 20' are shown disposed above the wings 31', the structure and function of the entire device and wing supports 30' being otherwise substantially identical with the structure and function of the apparatus shown in the remaining figures.

The present invention further contemplates an apparatus of the type described which may be maintained in its operative and extended position when desired and which on the other hand may be moved to an inoperative position where the same will not in any manner affect or interfere with the normal flight of the aircraft. For this purpose apparatus and devices are provided which may be operated to move the rotors 20 from the extended and operative position shown in Figures 2, 4 and 5 to a folded and inoperative position, as shown in Figures 1, 3 and 6. In order to move or swing the rotors from the folded or inoperative position to the extended or operative position, the cables 33 having one end attached to the cross bars 34 on the free end of the rotor shaft, and being guided into the fuselage by means of guide pulleys 54, are wound on the drum 35; the latter being operated by means of the hand wheel 36 and the worm gearing 37. It will be understood that if desired a motor may be substituted for the hand wheel 36. The worm gearing 37 prevents the collapse or accidental folding of the rotors to their inoperative position which may be caused by the air pressure against such rotors during normal flight.

Winding the cable 33 on the drum 35 moves the rotors 20 from their folded to their extended positions, the same being guided in their movements by the supporting rods 30. The wings 31 are provided with projections 53 which serve to stop the forward movement of the rotors 20 by the engagement of the stops 53 with the supporting rods 30.

When it is desired to swing the rotors to their ineffective position, the hand wheel 36 is rotated in the reverse direction thus paying out the cables 33 and the air pressure will then swing the rotors to the folded position, the same being mover about the universal joint 25 and being guided in their movement by the supporting rods 30. The fuselage is provided with a housing 38 in the form of an open chamber on each side of the fuselage to receive the corresponding rotor 20. It will be seen, therefore, that when the rotors 20 are in their folded positions they offer substantially no resistance to flight.

When the machine is at rest on the ground, the swinging of the rotors from their effective position shown in Figure 5 to the ineffective position, is accomplished by the pulling of the cables 39 which are attached to the ends of the cross bars 34 opposed to the connection of the cables 33. The cables 39 are wound on the drum 40, these drums being operated by means of a cable 41 which transmits power from the wheel 36 to the drum 40. As will be seen from an inspection of Figure 8, the drum 35 is connected by a pawl 42a and ratchet 42b, with a drum 42 which is rotatable in one direction together with the drum 35 by means of the hand wheel 36 while retracting the rotors. The endless cable 41 is wound several times around the drum 42 and serves to transmit power from the drum 42 to the drum 43, guide pulleys 52 being provided for the proper guidance of the cable 41 in its travel from the drum 42 to the drum 43. The drum 43 transmits its power to the drum 40 preferably by frictional engagement therewith. For this purpose the drum 43 is provided with a flange 44 which supports the drum 40. The shaft 45 which carries the drum 43 is pinned to the drum by means of a pin 46 and rotates therewith. The drum 40 is preferably freely rotatable upon the shaft 45.

In its extended portion the shaft 45 has a plate 47 which is keyed on to the shaft 45 and rotates therewith. The upper end of the shaft 45 carries a fixed collar 48 and a helical spring 49 which is disposed between the collar 48 and the plate 47. The drum 40 is, therefore, held in frictional engagement with the flange 44 and the drum 43 and will rotate therewith, at the same time providing the necessary amount of slippage.

It will be seen therefore that by means of the device described immediately above the operation of the hand wheel 36 will serve to rotate the drum 40, so that at the same time that the cables 33 are being paid out, the cables 39 are being taken up and wound on the drum 40, thereby swinging the rotors 20 to their folded or inoperative positions. It will also be understood that when the rotors are being swung out by the cables 33 the pawl 42a rides idly over the ratchet 42b thus permitting the cables 39 to unwind from the drum 40.

The dums 42 and 43 are of substantially the same external diameter whereas the drum 40 is of considerably greater diameter than the drum 35 for the reason that the winding up of the cable 39 is much greater than the paying out of the cable 33. The drum 40 is preferably provided with a lateral flange 50 approximately midway thereof, thereby dividing the drum into an upper and lower portion, one for receiving the right hand cable 39 and the other for receiving the left hand cable 39. Guide pulleys 51 are also provided immediately in front of the drum 40 which guides the cables 39 in the proper direction to the drum 40.

In order to prevent the cables 33 from touching and working against the side of the fuselage and from touching and working against the rotors 20 when the rotor is in its folded or inoperative position, guide pulleys 55 are provided on the sides of the fuselage.

It will be seen from the above that the present invention provides a pair of rotors which may be operated to increase the buoyancy of the aircraft, the same being held in a rigid extended position by means of the supporting rod 30, and the same being held against any possible accidental collapse by means of the cables 33 and the worm gearing 37. When, however, the aircraft is in normal flight, the rotors may, by a simple operation of merely paying out the cable 33, be moved to a folded and ineffective position. This movement is accomplished by the air pressure against the rotors when the aircraft is in flight or when the aircraft is at rest it is effected by the transfer of the rotation of the hand wheel 36 to the drum 40 which serves to wind the cables 39 and thereby move the rotor to its folded position and to hold the same in that position.

The modified form shown in Figure 11 has already been described in part in that it was pointed out that the differences between this form and the preferred form is that the rotors 20′ are disposed over the wings 31′. In other respects this embodiment of the invention is substantially identical with that shown in the other figures and all of the operating devices are substantially the same. Other small differences, however, should be noted such as the fact that the drums 42′ and 35′ are separated from each other by the operating shaft 56 and the hand wheel 36′ is disposed between these two drums. At the other end of the cable 41′ the drums 43′ and 40′ also have a somewhat different spatial relationship and the helical spring 49′ is disposed between the drum 43′ and the drum 40′ but serves substantially the function in substantially the same way.

It may be here noted that although in the drawings the rotors were shown as simple cylinders, it will be understood that rotors of any cross section as well as of any contour may be employed.

I have described what I believe to be the best embodiment of my invention. I do not wish, however, to be confined to the embodiments shown, but what I desire to cover by Letters Patent is set forth in the appended claims.

What is claimed is:

1. In an aircraft, a fuselage, a shaft disposed transversely of said fuselage and extending exteriorly thereof, means for rotating said shaft, wings carried by said fuselage, a revoluble sustaining element, pivotally carried by each end of said shaft, and a pair of struts each carried at one end by each of said wings and connected at the other end to the free end of said elements.

2. In an aircraft, a fuselage, a shaft disposed transversely of said fuselage and extending exteriorly thereof, means for rotating said shaft, a pair of lateral wings carried by said fuselage, a revoluble sustaining element, pivotally carried by each end of said shafts, and a pair of struts one carried at one end by each of said wings and connected at the other end to the free end of each of said elements, said rigid struts being pivotally connected to said wings and to said elements.

3. In an aircraft, a fuselage, a pair of lateral wings carried by said fuselage, a shaft disposed transversely of said fuselage and extending outwardly therefrom at each end, means for rotating said shaft, a pair of rotors disposed exteriorly of said fuselage laterally thereof and in planes approximately parallel to and spaced from the planes of the wings, each of said rotors having a longitudinal shaft passing therethrough and extending from each end thereof, a universal joint connecting each end of the first mentioned shaft with one end of the second mentioned shaft, whereby said rotors may be revolved when the same are in outwardly extending position, a strut pivotally mounted on each end of said wings, each of said struts being pivotally attached to the free end of said cylinders, and means for holding said rotors in a laterally extended position and for moving the same to a longitudinally folded position.

4. In an aircraft, a fuselage, a pair of lateral wings carried by said fuselage, a shaft disposed transversely of said fuselage and extending outwardly therefrom at each end, means for rotating said shaft, a pair of rotors disposed exteriorly of said fuselage laterally thereof and in planes approximately parallel to and spaced from the planes of the wings, each of said rotors having a longitudinal shaft passing therethrough and extending from each end thereof, a universal joint connecting each end of the first mentioned shaft with one end of the second mentioned shaft, whereby said rotors may be rotated when the same are in outwardly extending position, a strut pivotally mounted on each of said wings, each of said struts being pivotally attached to the free end of said rotors, a cable attached to the free end of each of the rotors, said cable being connected to a drum disposed within the fuselage and in front of said rotors, and means for rotating said drum to move said rotors from operative position to a folded position alongside the fuselage.

5. In an aircraft, a fuselage, a pair of lateral wings carried by said fuselage, a shaft disposed transversely of said fuselage and extending outwardly therefrom at each end, means for rotating said shaft, a pair of rotors disposed exteriorly of said fuselage laterally thereof and in planes approximately parallel to and spaced from the planes of the wings, each of said rotors having a longitudinal shaft passing therethrough and extending from each end thereof, a universal joint connecting each end of the first mentioned shaft with one end of the second mentioned shaft, whereby said rotors may be rotated when the same are in outwardly extending position, a strut pivotally mounted on each of said wings, each of said struts being pivotally attached to the free end of said rotors, a cable attached to the free end of the rotors, said cables being connected to a drum disposed within the fuselage and in front of said rotors, and means for rotating said drum to move said rotors from operative position to a folded position alongside the fuselage, said fuselage being provided with chambers to receive said rotors into folded position.

6. In an aircraft, a fuselage, a pair of lateral wings carried by said fuselage, a shaft disposed transversely of said fuselage and extending outwardly therefrom at each end, means for rotating said shaft, a pair of rotors disposed exteriorly of said fuselage laterally thereof and in planes approximately parallel to and spaced from the planes of the wings, each of said rotors having a longitudinal shaft passing therethrough and extending from each end thereof, a universal joint connecting each end of the first mentioned shaft with one end of the second mentioned shaft, whereby said rotors may be rotated when the same are in outwardly extending position, a strut pivotally mounted on each of said wings, each of said struts being pivotally attached to the free end of said rotors, a cable attached to the free end of each of the rotors, said cables being connected to drums disposed within the fuselage, and means for rotating said drums to move said rotors from operative position to a folded position alongside the fuselage, said fuselage being provided with a chamber to receive said rotors into folded position, said means also serving to move said rotors from the folded position to the operative position.

7. In an aircraft, a fuselage, a pair of lateral wings carried by said fuselage, a shaft disposed transversely of said fuselage and extending outwardly therefrom at each end, means for rotating said shaft, a pair of rotors disposed exteriorly of said fuselage laterally thereof and in planes approximately parallel to and spaced from the planes of the wings, each of said rotors having a longitudinal shaft passing therethrough and extending from each end thereof, a universal joint connecting each end of the first mentioned shaft with one end of the second mentioned shaft, whereby said rotors may be rotated when the same are in outwardly extending position, a strut pivotally mounted on each of said wings, each of said struts being pivotally attached to the free end of said rotors, a pair of cables attached to the free end of each of the rotors, one of said cables being connected to a drum disposed within the fuselage and in front of said rotors, the other of said cables being connected to a drum disposed in the fuselage and in the rear of said rotors, and means for rotating said drums to move said rotors from operative position to a folded position alongside the fuselage, said fuselage being provided with a chamber to receive said rotors into folded position, said means also serving to move said rotors from the folded position to the operative position.

8. In an aircraft, a fuselage, a pair of lateral wings carried by said fuselage, a shaft disposed transversely of said fuselage and extending outwardly therefrom at each end, means for rotating said shaft, a pair of rotors disposed exteriorly of said fuselage laterally thereof and in planes approximately parallel to and spaced from the planes of the wings, each of said rotors having a longitudinal shaft passing therethrough and extending from each end thereof, a universal joint connecting each end of the first mentioned shaft with one end of the second mentioned shaft, whereby said rotors may be rotated when the same are in outwardly extending position, a strut pivotally mounted on each of said wings, each of said struts being pivotally attached to the free end of said rotors, a pair of cables attached to the free end of each of the rotors, one of said cables being connected to a drum disposed within the fuselage and in front of said rotors, the other of said cables being connected to a drum disposed in the fuselage and in the rear of said rotors, means for rotating said drums to move said rotors from operative position to a folded position alongside the fuselage, said fuselage being provided with a chamber to receive said rotors into folded position, said means also serving to move said rotors from the folded position to the operative position, and a stop on said wing engaging said struts to limit the said movement of said rotors.

In testimony whereof I have affixed my signature to this specificaton.

NICHOLAS J. MEDVEDEFF.

CERTIFICATE OF CORRECTION.

Patent No. 1,890,064.                                            December 6, 1932.

NICHOLAS J. MEDVEDEFF.

It is hereby certified that error appears in the printed specification of the above numbered patent requiring correction as follows: Page 3, line 103, claim 1, after "of" insert the words "each of"; and that the said Letters Patent should be read with this correction therein that the same may conform to the record of the case in the Patent Office.

Signed and sealed this 21st day of February, A. D. 1933.

M. J. Moore, (Seal)                                           Acting Commissioner of Patents.